June 24, 1958 C. H. EDWARDS, JR., ET AL 2,839,825
CARBON BLACK PRODUCING FURNACE AND METHOD OF CONSTRUCTION
Filed April 8, 1954 5 Sheets-Sheet 1
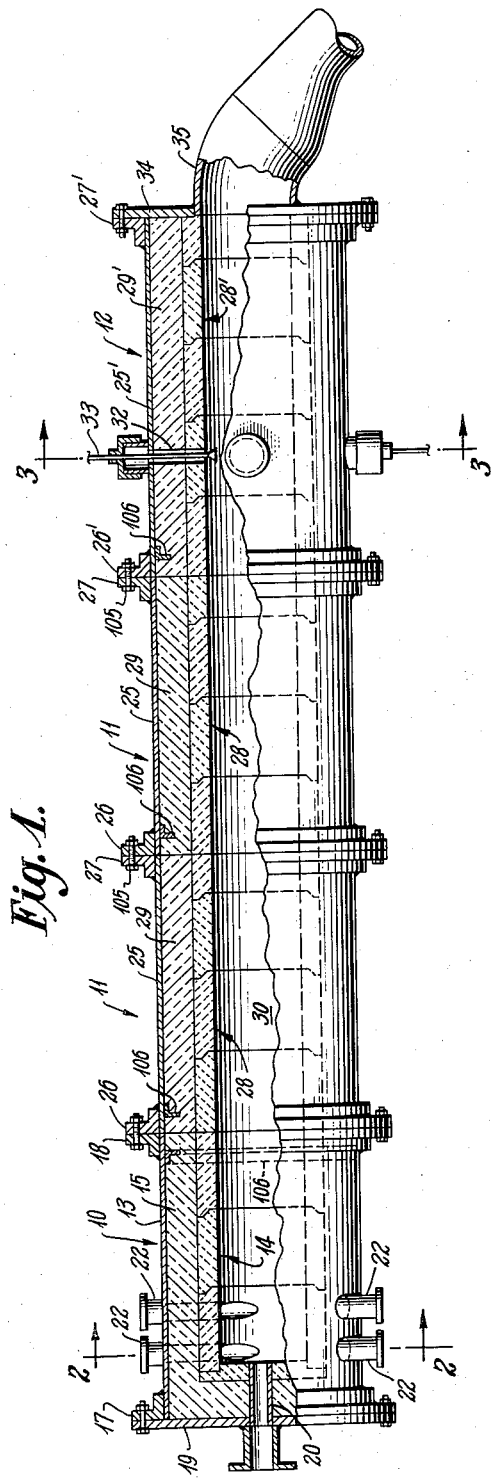
INVENTORS
C. H. Edwards, Jr. &
BY  T. S. Whitsel, Jr.
Hudson + Young
ATTORNEYS

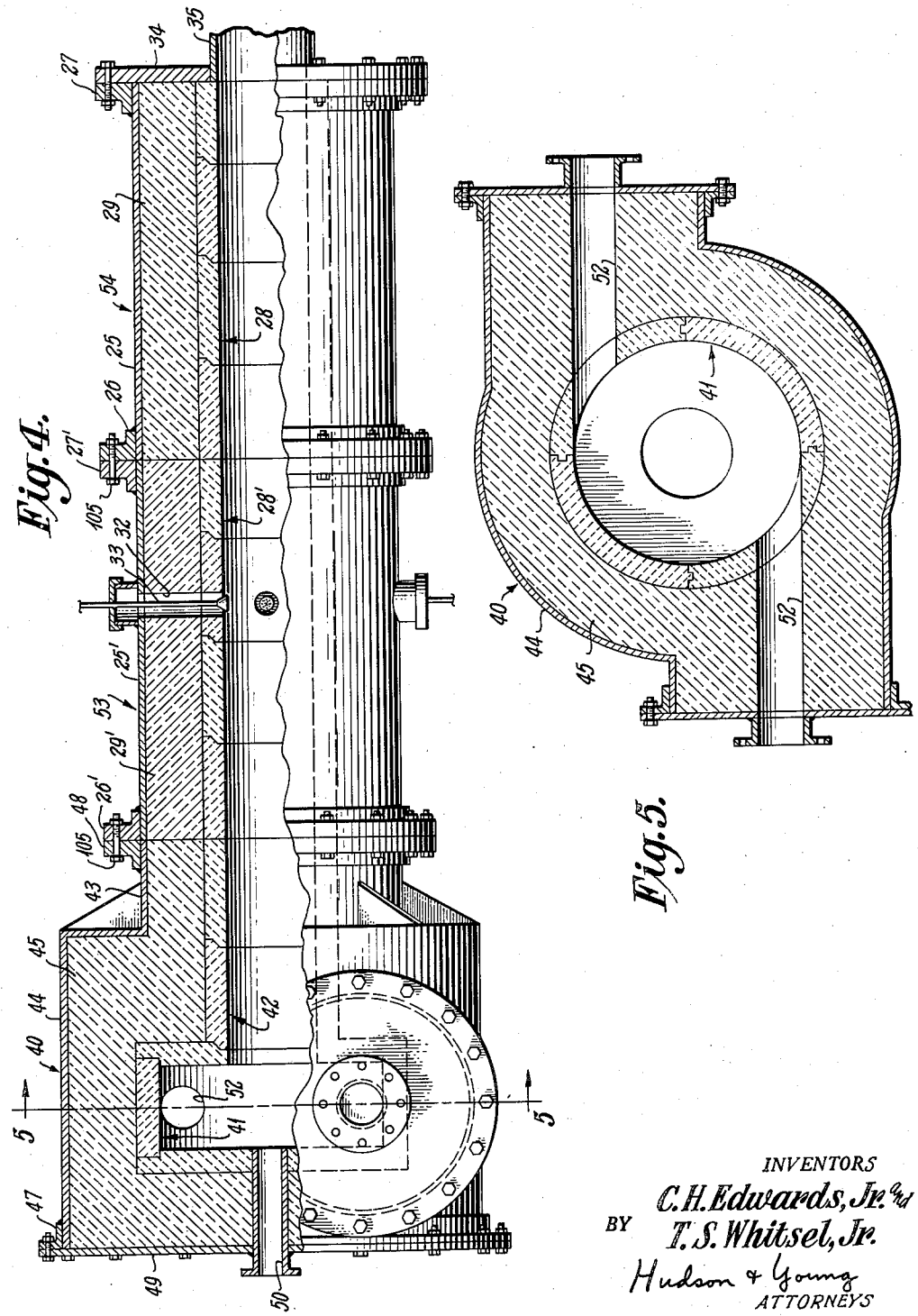

INVENTORS
C. H. Edwards, Jr. and
BY  T. S. Whitsel, Jr.
Hudson & Young
ATTORNEYS June 24, 1958 C. H. EDWARDS, JR., ET AL 2,839,825
CARBON BLACK PRODUCING FURNACE AND METHOD OF CONSTRUCTION
Filed April 8, 1954 5 Sheets-Sheet 5

INVENTORS
C. H. Edwards, Jr. 2nd
T. S. Whitsel, Jr.
BY
Hudson & Young
ATTORNEYS

United States Patent Office 2,839,825
Patented June 24, 1958

2,839,825

CARBON BLACK PRODUCING FURNACE AND METHOD OF CONSTRUCTION

Clyde H. Edwards, Jr., and Travis S. Whitsel, Jr., Borger, Tex., assignors to Phillips Petroleum Company, a corporation of Delaware Application April 8, 1954, Serial No. 421,762

4 Claims. (Cl. 29—455)

This invention relates to carbon black producing furnaces. In another aspect it relates to a method of constructing furnaces. In still another aspect it relates to apparatus employed to construct refractory furnace sections.

The production of carbon black by the so-called furnace method has become well known in recent years. Two types of furnaces which have been developed for this use are described in United States Patents 2,375,795 and 2,564,700. These furnaces are characterized, generally, by an elongated cylindrical reaction chamber which is defined by a refractory liner that is surrounded by a quantity of heat insulating material. The reactant materials are introduced into a "precombustion" section attached upstream from an "after-reaction" section. Quenching means are provided in the after-reaction section or downstream therefrom. Both the configuration of the precombustion section and the position of the quenching means influence the properties of the resulting carbon black. The commercial carbon black producing furnaces of the types described in the above-mentioned patents often are of considerable size and as such require large quantities of refractories which makes their construction and replacement expensive. When these furnaces become worn or when leaks occur, such faults usually are localized at one or two points. Heretofore, the replacement of an entire furnace because of a fault which may have occurred at only a single point has resulted in a considerable waste of time and materials.

In accordance with the present invention there are provided improved sectionalized carbon black producing furnaces and a method of making such furnaces. These furnaces include a precombustion section into which the reactant materials are introduced. Downstream from the precombustion chamber there is connected an after-reaction section which either includes, or is followed by, a quench section. The latter two sections are defined by a cylindrical body of refractory material which forms a central passage. The quench sections are provided with one or more radial ports through which water or other fluids can be introduced into the central passage. Both these latter sections are constructed with the aid of a centering jig which includes a base plate to which is bolted an annular flange. An upright cylindrical shell is welded to the flange to define the outer wall of the section. A centering support is placed within the shell and a plurality of precast refractory sectors are fitted about the support to form a hollow cylinder coaxial of the shell. The region between the refractory cylinder and the shell is filled with a castible refractory. The top of this castible refractory is leveled and a second annular flange is welded to the top of the shell to complete the section. The centering support is removed after the castible refractory has hardened. The sections thus formed can readily be bolted to one another to form an after-reaction section of the desired length for a particular furnace. The quench sections are formed by drilling holes through the side walls. These sections can be assembled to form furnaces of desired configurations, and individual sections can be replaced without disturbing the remainder of the furnace.

Accordingly, it is an object of this invention to provide a simplified method of constructing carbon black producing furnaces of precast and castible refractories.

Another object is to provide a sectionalized furnace whereby individual sections can readily be removed for repair and replacement.

A further object is to provide apparatus for use in constructing carbon black producing furnaces.

Other objects, advantages and features of this invention should become apparent from the following detailed description taken in conjunction with the accompanying drawing in which:

Figure 1 is a view, shown partially in section, of an assembled carbon black producing furnace constructed in accordance with the present invention;

Figure 2 is a sectional view taken along line 2—2 in Figure 1;

Figure 3 is a sectional view taken along line 3—3 in Figure 1;

Figure 4 is a view, shown partially in section, of a second embodiment of carbon black producing furnace;

Figure 5 is a sectional view taken along line 5—5 in Figure 4;

Figure 6:
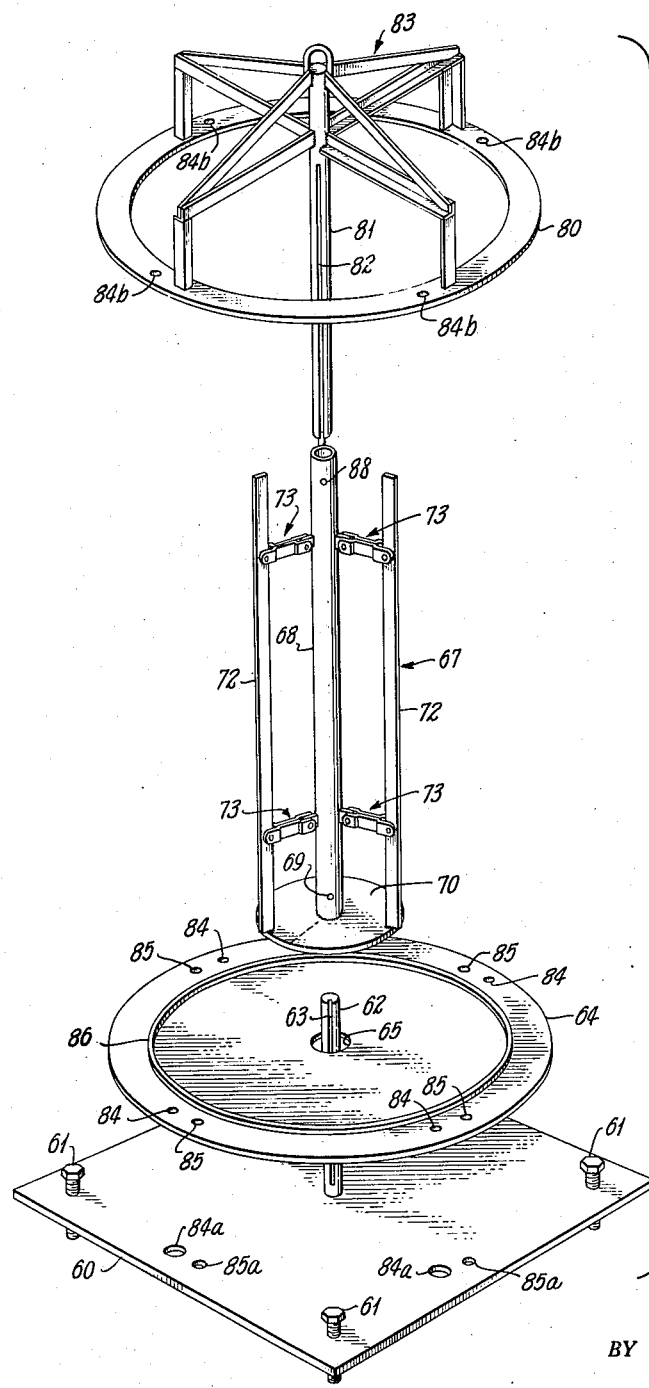
Figure 6 is a view of the centering jig, in disassembled position, employed to construct the individual sections of the furnaces of Figures 1 and 4.
Figure 7:
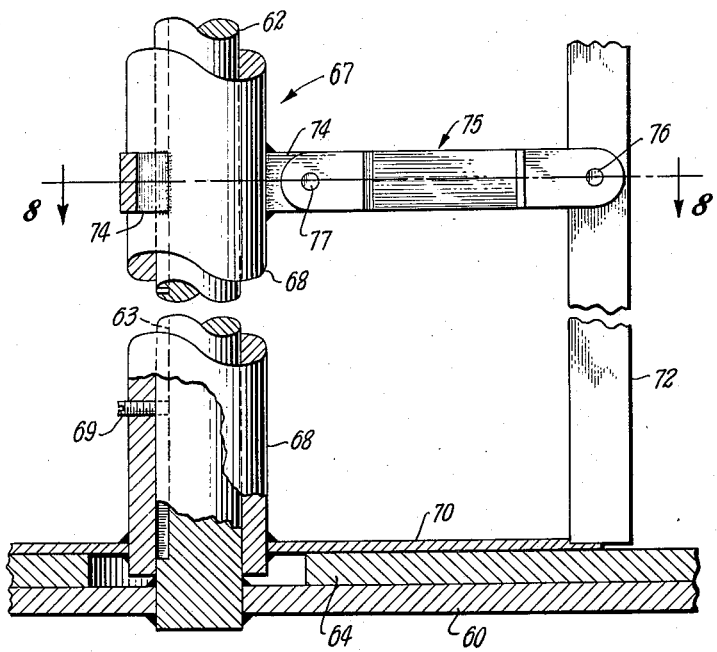
Figure 7 is a detailed view of a portion of the jig of Figure 6.
Figure 8:
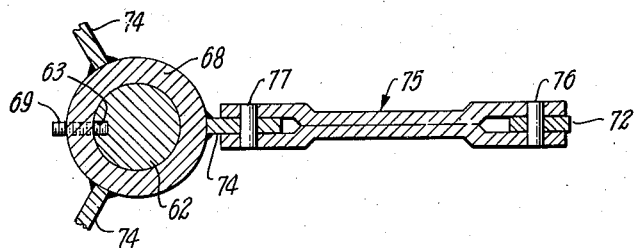
Figure 8 is a sectional view taken along line 8—8 in Figure 7.

Referring now to the drawing in detail and to Figures 1, 2 and 3 in particular, there is shown a carbon black producing furnace which comprises a precombustion section 10, a pair of after-reaction sections 11 and a quench section 12. Precombustion section 10 is formed of a cylindrical metal shell 13 which encloses a hollow refractory cylindrical liner 14. The region between shell 13 and liner 14 is filled with a mass of refractory 15. Annular flanges 17 and 18 are welded to the respective ends of shell 13. A circular plate 19 extends across one end of shell 13 and is bolted to flange 17. A conduit 20 extends through a central opening in plate 19 into the interior of section 10. A nozzle, not shown, is adapted to extend through conduit 20 to supply reactant materials to the interior of the furnace. A plurality of passages 22 extends through the side wall of section 10 to permit the introduction of gases into the furnace in directions generally tangentially to the inner wall of liner 14.

After-reaction sections 11 are formed of metal shells 25 of diameter substantially equal to the diameter of shell 13. Annular flanges 26 and 27 are welded to the respective ends of sections 11 to enable these sections to be attached to one another and to sections 10 and 12. Hollow refractory cylinders 28 are enclosed by shells 25, and the regions between cylinders 28 and shells 25 are filled with masses of refractory 29. The inner diameters of cylinders 28 are substantially the same as the inner diameter of cylinder 14 so that a uniform diameter central passage 30 is formed through sections 10 and 11.

Quench section 12 is generally similar to sections 11 and corresponding elements are designated by like primed reference numerals. Section 12 differs from section 11 in that a plurality of radial passages is formed in the side wall, through which conduits 33 extend to introduce water or other fluid into the furnace to quench the reaction products. A circular plate 34 having a central opening therein is bolted to flange 27'. A conduit 35 is attached to plate 34 to define the outlet passage from the furnace. Conduit 35 is in turn attached to conventional cooling and carbon black separating means, not shown, which are disposed downstream from the furnace.

The carbon black producing furnace thus far described operates upon the principles described in U. S. Patent 2,375,795, and reference is made to this patent for a detailed description of the operation of such a furnace to produce carbon black.

In Figures 4 and 5 there is shown a second type of carbon black producing furnace. The precombustion section 40 of this second furnace includes first and second hollow coaxial abutting refractory cylindrical liners 41 and 42. The downstream end of liner 42 is enclosed by a metal shell 43 which is attached to or made integral with a larger diameter shell 44 which encloses liner 41. The region between liners 41 and 42 and shells 43 and 44 is filled with a refractory 45. An annular flange 47 is welded to the end of shell 44, and an annular flange 48 is welded to the end of shell 43. A circular metal plate 49 is bolted to flange 47 so as to extend across the end of section 40. A conduit 50 extends through a central opening in plate 49 to define a passage for a nozzle, not shown, which supplies reactant materials to the interior of section 40. A plurality of passages 52 extends through the side wall of section 40 to direct the introduction of gases into the interior of section 40 in directions generally tangentially of the side wall of liner 41. A quench section 53 is attached to the downstream end of chamber 40. Quench section 53 corresponds generally to section 12 of Figure 1 and like reference numerals are employed to designate corresponding elements. An outlet section 54, which corresponds to section 11 of Figure 1, is attached to the downstream end of quench section 53. An end plate 34 is disposed across the second end of section 54 and an outlet conduit 35 is attached thereto.

The furnace illustrated in Figures 4 and 5 is operated as described in the copending application of J. C. Krejci, Serial No. 406,695, filed January 28, 1954, now abandoned. By replacing quench section 53 with a second section 54 and by providing quenching means in outlet conduit 35, a furnace which is basically of the type shown in U. S. Patent 2,564,700 is formed. Thus, by forming the several quench and after-reaction sections of uniform diameter, it is possible to interchange these sections as desired to form furnaces of various configurations which produce carbon blacks having distinctive properties.

The jig illustrated in Figures 6, 7, 8 and 9 is employed in constructing these individual sections. This jig comprises a flat base plate 60 which has a plurality of leveling screws 61 extending downwardly therethrough. A cylindrical rod 62, having a longitudinal keyway 63 therein, is secured to and extends upwardly from plate 60. A circular plate 64, having a central opening 65 therein, is adapted to rest on base plate 60 such that rod 62 extends through opening 65. A centering guide 67 is provided to rest on plate 64. Guide 67 comprises a hollow rod 68 having an inner diameter slightly larger than the diameter of rod 62. A set screw 69 extends through rod 68 to engage keyway 63, thereby retaining the centering guide in alignment with base plate 60. An annular plate 70 is attached to the lower end of rod 68. Plate 70 supports a plurality of upright bars 72 which are pivotally attached to rod 68 by hinges 73. As shown in detail in Figures 7 and 8, hinges 73 each comprise a plate 74 welded to rod 68 and a bar 75 which is attached to a bar 72 at one end by a pin 76 and to plate 74 at its second end by a pin 77. Bars 72 extend slightly beyond the edge of plate 70 when these bars rest on plate 70. An annular plate 80, Figure 6, is secured to a rod 81, which has a keyway 82 therein, by a frame assembly 83. Rod 81 extends coaxial of plate 80 and is of such diameter as to fit into the top of rod 68. A second set screw 88 in rod 68 engages keyway 82 to align plate 80 with respect to guide 67.

Plate 64 is provided with two groups of spaced bolt holes 84 and 85. Corresponding holes 84a and 85a are drilled in base plate 60, holes 84a being of sufficient diameter to receive the heads of bolts, not shown in Figure 6, which are passed through holes 84. Bolt holes 84b are drilled in annular plate 80 in the same relative spacings as holes 84 occupy in plate 64. An annular flange 86 is welded on plate 64 inside the bolt holes 84 and 85.

Figure 9:
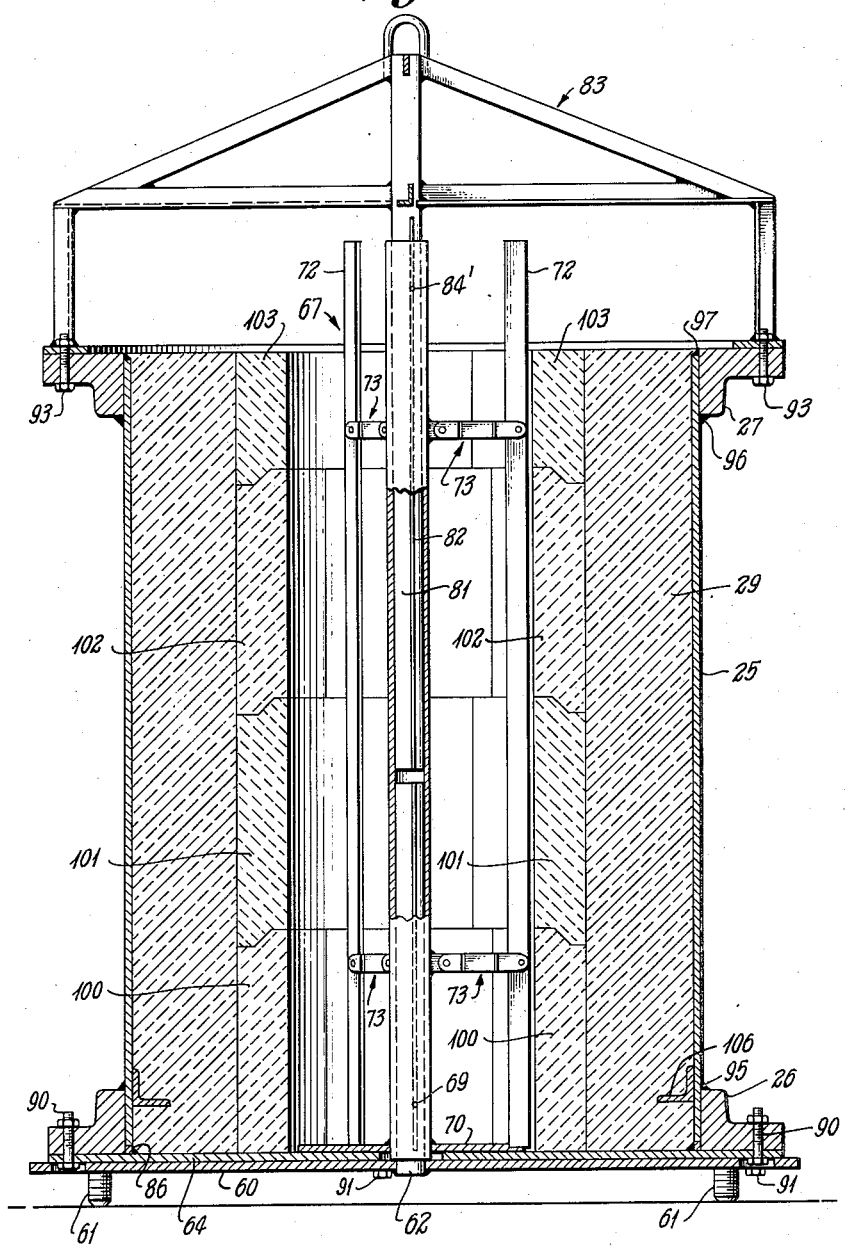
Figure 9 is a sectional view of the assembled jig supporting a furnace section.

The construction of the furnace sections is illustrated in Figure 9. Flange 26 is first attached to plate 64 by bolts 90 which pass through holes 84 of plate 64 and corresponding holes in flange 26. This assembly is then bolted to base plate 60 by bolts 91 which extend through holes 85a, 85 and corresponding holes in flange 26. Cylindrical shell 25 is then mounted on top of flange 86 inside flange 26. Guide 67 is mounted on rod 62 and locked in position by set screw 69. Following this, flange 27 is secured to plate 80 by bolts 93 which extend through holes 84b and corresponding holes in flange 27. This assembly of flange 27 and plate 80 is then attached to the base assembly by inserting rod 81 in rod 68. Flange 26 is secured to shell 25 by a weld 95 and flange 27 is secured to shell 25 by welds 96 and 97.

A first layer of precast curved refractory sectors 100 is placed on plate 64 outside bars 72 of guide 67. These sectors form a portion of cylinder 28. The individual sectors 100 are flat on the bottom edge and provided with grooved upper edges to make lap joints with a second layer of curved precast refractory sectors 101 which is placed upon the first layer. As shown in Figure 3, the individual sectors 100, 101 are of such configuration as to be joined to one another by tongue-and-groove joints. Any desired number of sectors 100, 101 can be employed in each layer. As shown in Figure 3, four sectors 101 are preferred when it is desired to use four quench passages 32 in quench section 12. Each layer of sectors is offset from the adjacent layers so that the joints are not in alignment. Layers of like sectors 102 and 103 are added to extend cylinder 28 to the top of flange 27, the top surface of sectors 103 being flush with flange 27. These several sectors can be retained in place surrounding guide 67 by paper tape or twine which is wrapped around each layer. After the precast sectors are thus positioned, the region between these sectors and shell 25 is filled with a castible refractory material 29. Material 29 is tamped in the annular interspace and the top is smoothed flush with the top of flange 27. Plate 64 can be coated with wax prior to the insertion of refractory material 29 to prevent this material from adhering to plate 64 after the section is completed. When sufficient time has elapsed for refractory material 29 to harden, the mold is disassembled and the lower surface of flange 26 is welded to shell 25 at the region previously occupied by flange 86.

Precast sectors 100–103 and refractory material 29 can be formed of any desired commercially available refractories. Excellent results have been obtained when sectors 100—103 were formed of a material known in the art as "Mullfrax," manufactured by the Carborundum Co. and material 29 was "Alfrax BI," also manufactured by the Carborundum Co. Other suitable precast refractory materials which can be employed are known in the art as: "Carbofrax," "Refrax," "Crystallite A" and "Sillimanite." The important physical requirements of these materials are heat resistance, spall and crack resistance, and erosion or abrasion resistance. The castible refractory can be any material having high heat resistance and low thermal conductivity. The completed section is air-dried in an upright position sufficient time for the castible refractory to harden. This can be of the order of forty-eight hours, for example, when "Alfrax BI" is employed. The section can then be mounted in a furnace and the temperature elevated from 200° F. to 600° F. until steaming is completed. The section is then ready for curing at elevated temperatures by increasing the temperature from 600° F. to 1500° F. at an increase of 25° F. per hour, for example.

If it is desired to employ the thus formed section as a quench section in a furnace, passages 32 are drilled in the wall to receive spray conduits 33. Alternatively, removable rods can be inserted in the mold assembly prior to the insertion of the castible refractory. The individual sections are joined to one another by bolts 105 which pass through flanges 26 and 27. It is preferred to employ a small quantity of refractory cement to seal the edges between abutting sections. As illustrated in Figure 1, flanges 106 can be welded to the inner surfaces of the metal shells adjacent one or both ends, if desired. These flanges tend to block the flow of gases along the inner surfaces of the metal shells if leaks should develop in the refractories.

From the foregoing description it should be apparent that there is provided in accordance with this invention an improved carbon black producing furnace and a method of construction same. The advantages of such an assembly include: economy of construction in that a skilled brick layer is not required, a saving in the time required for construction, ease of handling the individual sections, and economy in replacing worn sections.

While this invention has been described in conjunction with a present preferred embodiment, it should be apparent that the invention is not limited thereto.

What is claimed is:

1. The method of constructing a carbon black producing furnace having an elongated cylindrical passage surrounded by a quantity of refractory material which comprises, in combination, the steps of initially securing a first cylindrical flange to a lower base assembly; mounting in an upright manner a cylindrical hollow metal shell on said base assembly inside first flange; mounting axial expandable guide means within said shell upon said lower base assembly and securing same thereto in its expanded position; securing a second cylindrical flange to an upper base assembly and mounting the combination upon said shell; welding said first and second flanges to said shell; mounting plural cylindrical layers of precast refractory sections upon said lower base assembly in spaced relation with the inner wall of said shell; centering said sections by said guide means, the latter adapted to maintain said sections in an upright cylindrical form and prevent inward displacement and misalignment thereof; filling the annular region between said refractory sections and said shell with castible refractory material by introducing said castable refractory material therein through the upper open end of said region; curing said refractory material; disassembling said shell from said upper and lower base assemblies; raising said guide means out of contact with the inner wall of said sections so as to collapse the said guide means; removing said guide means in its collapsed position from the interior of said refractory sections; and joining said shell to a plurality of similar interchangeable shells whereby the interior of said shells so joined form an elongated cylindrical passage.

2. The method in accordance with claim 1 further comprising drilling at least one passage in one of said sections from the exterior of the shell of said section to the interior of the hollow cylinder of said section.

3. The method of constructing a section of a carbon black producing furnace which comprises, in combination, the steps of initially securing a first cylindrical flange to a lower base assembly; mounting in an upright manner a cylindrical hollow metal shell on said base assembly inside said first flange; mounting axial expandable guide means within said shell upon said lower base assembly and securing same thereto in its expanded position; securing a second cylindrical flange to an upper base assembly and mounting the combination upon said shell; welding said first and second flanges to said shell; mounting plural cylindrical layers of precast refractory sections upon said lower base assembly in spaced relation with the inner wall of said shell; centering said sections by said guide means, the latter adapted to maintain said sections in an upright cylindrical form and prevent inward displacement and misalignment thereof; filling the annular region between said refractory sections and said shell with castible refractory material by introducing said castable refractory material therein through the upper open end of said region; curing said refractory material; disassembling said shell from said upper and lower base assemblies; raising said guide means out of contact with the inner wall of said sections so as to collapse the said guide means and removing said guide means in its collapsed position from the interior of said refractory sections.

4. The method in accordance with claim 3 further comprising forming at least one passage in said section from the exterior of said shell to the interior of said member through said shell, said refractory material and said member.

References Cited in the file of this patent

UNITED STATES PATENTS

| | | |
|---|---|---|
| Re. 22,886 | Ayers | June 3, 1947 |
| 2,096,850 | Forsberg | Oct. 26, 1937 |
| 2,306,760 | Shaw | Dec. 29, 1942 |
| 2,342,392 | Evans | Feb. 22, 1944 |
| 2,420,999 | Ayers | May 27, 1947 |
| 2,440,423 | Wiegand et al. | Apr. 27, 1948 |
| 2,440,424 | Wiegand et al. | Apr. 27, 1948 |
| 2,686,961 | Ellefson | Aug. 24, 1954 |
| 2,731,466 | Heffner | Jan. 17, 1956 |